(12) United States Patent
Evans

(10) Patent No.: US 8,955,906 B2
(45) Date of Patent: Feb. 17, 2015

(54) ENERGY ABSORBING BRACKET FOR A SEAT OF A VEHICLE

(75) Inventor: Jonathan Evans, Canton, MI (US)

(73) Assignee: BASF SE, Ludwigshafen (DE)

( * ) Notice: Subject to any disclaimer, the term of this patent is extended or adjusted under 35 U.S.C. 154(b) by 0 days.

(21) Appl. No.: 13/823,046

(22) PCT Filed: Sep. 14, 2011

(86) PCT No.: PCT/US2011/051554
§ 371 (c)(1),
(2), (4) Date: Mar. 13, 2013

(87) PCT Pub. No.: WO2012/037218
PCT Pub. Date: Mar. 22, 2012

(65) Prior Publication Data
US 2013/0175833 A1    Jul. 11, 2013

Related U.S. Application Data

(60) Provisional application No. 61/382,582, filed on Sep. 14, 2010.

(51) Int. Cl.
*B60N 2/42* (2006.01)
*B60N 2/427* (2006.01)
*B60N 2/68* (2006.01)

(52) U.S. Cl.
CPC .......... *B60N 2/42709* (2013.01); *B60N 2/4228* (2013.01); *B60N 2/42745* (2013.01); *B60N 2/68* (2013.01); *B60N 2/682* (2013.01)
USPC ............. 297/216.13; 297/216.14; 297/452.18

(58) Field of Classification Search
CPC ........................... B60N 2/42709; B60N 2/686
USPC ............... 297/216.1, 216.13, 216.14, 452.18, 297/452.2
See application file for complete search history.

(56) References Cited

U.S. PATENT DOCUMENTS

| 3,544,164 A | 12/1970 | Ohta |
| 3,802,737 A | 4/1974 | Mertens |

(Continued)

FOREIGN PATENT DOCUMENTS

| DE | 4421946 A1 | 6/1995 |
| DE | 19831218 A1 | 1/2000 |

(Continued)

OTHER PUBLICATIONS

English language abstract and machine-assisted English translation for DE 4421946 extracted from the espacenet.com database on Jun. 21, 2013, 16 pages.

(Continued)

*Primary Examiner* — Rodney B White
(74) *Attorney, Agent, or Firm* — Howard & Howard Attorneys PLLC

(57) ABSTRACT

A bracket is used to couple together a seating frame member and a back frame member of a seat of a vehicle. The bracket comprises a periphery and a central longitudinal axis dividing the bracket into a front portion and a rear portion. The front portion of the bracket defines a yield segment for plastically deforming when a force above a predetermined value is applied to the back frame member. Plastically deforming the yield segment reduces an impact force transferred from the seat to an occupant. The periphery of the rear portion of the bracket includes a first contact surface and a second contact surface spaced from the first contact surface. The first contact surface moves into contact with the second contact surface as the yield segment plastically deforms thereby restricting the plastic deformation of the yield segment.

16 Claims, 7 Drawing Sheets

(56) References Cited

U.S. PATENT DOCUMENTS

| | | | |
|---|---|---|---|
| 4,109,959 A | 8/1978 | Barecki et al. | |
| 4,192,545 A | 3/1980 | Higuchi et al. | |
| 4,249,769 A | 2/1981 | Barecki | |
| 4,598,950 A | 7/1986 | Fourrey | |
| 4,997,233 A | 3/1991 | Sharon | |
| 5,029,942 A * | 7/1991 | Rink | 297/452.18 |
| 5,219,202 A | 6/1993 | Rink et al. | |
| 5,249,840 A | 10/1993 | Hoshihara et al. | |
| 5,310,247 A | 5/1994 | Fujimori et al. | |
| 5,447,360 A | 9/1995 | Hewko et al. | |
| 5,509,716 A | 4/1996 | Kolena et al. | |
| 5,676,421 A | 10/1997 | Brodsky | |
| 5,697,478 A | 12/1997 | Di Stefano | |
| 5,823,627 A * | 10/1998 | Viano et al. | 297/216.13 X |
| 6,003,937 A | 12/1999 | Dutton et al. | |
| 6,019,424 A * | 2/2000 | Ruckert et al. | 297/216.13 X |
| 6,022,074 A | 2/2000 | Swedenklef | |
| 6,053,571 A | 4/2000 | Faigle | |
| 6,109,690 A | 8/2000 | Wu et al. | |
| 6,142,563 A | 11/2000 | Townsend et al. | |
| 6,149,232 A * | 11/2000 | Meyer | 297/216.13 X |
| 6,409,263 B1 * | 6/2002 | Seibold | 297/216.13 |
| 6,520,577 B2 | 2/2003 | Kitagawa | |
| 6,523,893 B2 | 2/2003 | Kamper et al. | |
| 6,641,214 B2 | 11/2003 | Veneruso | |
| 6,709,053 B1 | 3/2004 | Humer et al. | |
| 6,761,412 B1 | 7/2004 | Garnweidner et al. | |
| 6,820,931 B2 | 11/2004 | Ruff et al. | |
| 6,926,358 B2 | 8/2005 | Fujita et al. | |
| 6,938,953 B2 * | 9/2005 | Håland et al. | 297/216.14 |
| 7,070,236 B2 | 7/2006 | Kawashima | |
| 7,303,229 B2 * | 12/2007 | Fujita et al. | 297/216.14 |
| 7,354,105 B2 | 4/2008 | Nelson et al. | |
| 7,537,283 B2 | 5/2009 | Niitsuma et al. | |
| 7,766,424 B2 * | 8/2010 | Haglund | 297/216.13 |
| 7,854,477 B2 | 12/2010 | Axelsson et al. | |
| 7,992,934 B2 | 8/2011 | Cailleteau | |
| 8,511,748 B2 * | 8/2013 | McLeod et al. | 297/216.1 |
| 8,523,284 B2 * | 9/2013 | Yamada et al. | 297/452.18 |
| 8,727,438 B2 * | 5/2014 | Nitsuma | 297/216.14 |
| 2004/0061364 A1 | 4/2004 | Humer et al. | |
| 2004/0070240 A1 * | 4/2004 | Håland et al. | 297/216.13 X |
| 2004/0135400 A1 | 7/2004 | Matsuzaki et al. | |
| 2005/0145597 A1 | 7/2005 | Kull et al. | |
| 2005/0231011 A1 * | 10/2005 | Fujita et al. | 297/216.14 |
| 2006/0103191 A1 | 5/2006 | De Wilde et al. | |
| 2008/0038569 A1 | 2/2008 | Evans et al. | |
| 2008/0100104 A1 | 5/2008 | Axelsson et al. | |
| 2009/0001786 A1 | 1/2009 | Haglund | |
| 2009/0021061 A1 | 1/2009 | Yamaki et al. | |
| 2010/0096892 A1 | 4/2010 | Meghira et al. | |
| 2010/0176621 A1 | 7/2010 | Aufrere et al. | |
| 2010/0194157 A1 | 8/2010 | Nitsuma et al. | |
| 2010/0259076 A1 | 10/2010 | Meghira et al. | |
| 2011/0043008 A1 | 2/2011 | Reel | |
| 2011/0193379 A1 * | 8/2011 | Nitsuma | 297/216.14 |
| 2013/0049416 A1 * | 2/2013 | Funke et al. | 297/216.13 |
| 2013/0099532 A1 * | 4/2013 | Izumida et al. | 297/216.14 |
| 2013/0307301 A1 * | 11/2013 | Munemura et al. | 297/216.13 |
| 2014/0103626 A1 * | 4/2014 | Seki et al. | 297/216.1 X |

FOREIGN PATENT DOCUMENTS

| | | |
|---|---|---|
| EP | 0709249 A2 | 5/1996 |
| EP | 0888926 A1 | 1/1999 |
| EP | 2127941 A1 | 12/2009 |
| FR | 2927581 A1 | 8/2009 |
| JP | 10-309968 A | 11/1998 |
| WO | WO 2006/083024 A1 | 8/2006 |
| WO | WO 2006/093644 A1 | 9/2006 |
| WO | WO 2012/037222 A2 | 3/2012 |
| WO | WO 2012/037233 A1 | 3/2012 |

OTHER PUBLICATIONS

English language abstract and machine-assisted English translation for DE 19831218 extracted from the espacenet.com database on Jun. 21, 2013, 18 pages.

English language abstract and machine-assisted English translation for EP 0888926 extracted from the espacenet.com database on Jun. 21, 2013, 31 pages.

English language abstract for EP 2127941 extracted from the espacenet.com database on Jun. 25, 2013, 17 pages.

English language abstract and machine-assisted English translation for FR 2927581 extracted from the espacenet.com database on Jun. 25, 2013, 37 pages.

English language abstract and machine-assisted English translation for JP 10-309968 extracted from the PAJ database on Jun. 25, 2013, 43 pages.

International Search Report for Application No. PCT/US11/51554 dated Feb. 13, 2012, 2 pages.

International Search Report for Application No. PCT/US11/51558 dated Feb. 16, 2012, 2 pages.

International Search Report for Application No. PCT/US11/51571 dated Feb. 13, 2012, 2 pages.

English language abstract for WO 2006/083024 extracted from espacenet.com database on Oct. 30, 2014, 2 pages. (Corresponds to U.S. 7,537,283 which was previously submitted on Dec. 11, 2013).

* cited by examiner

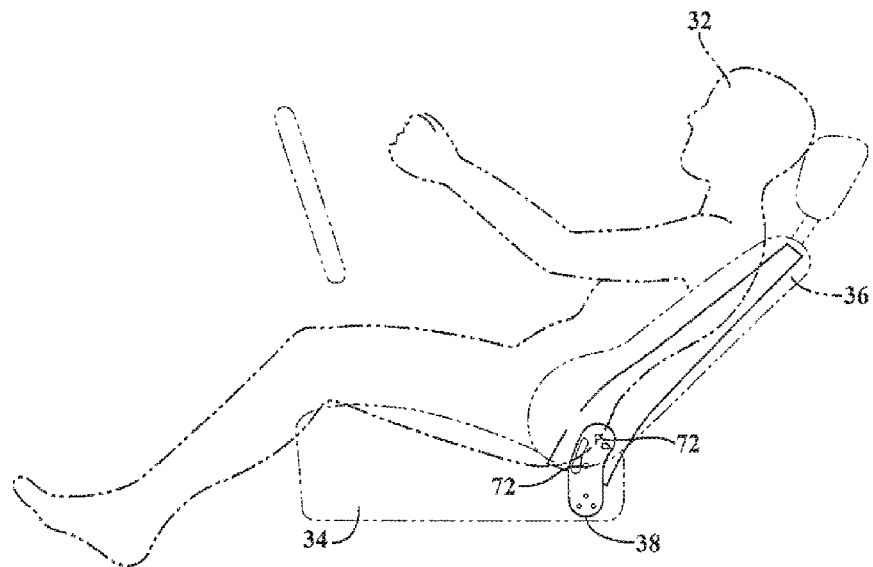
FIG. 6
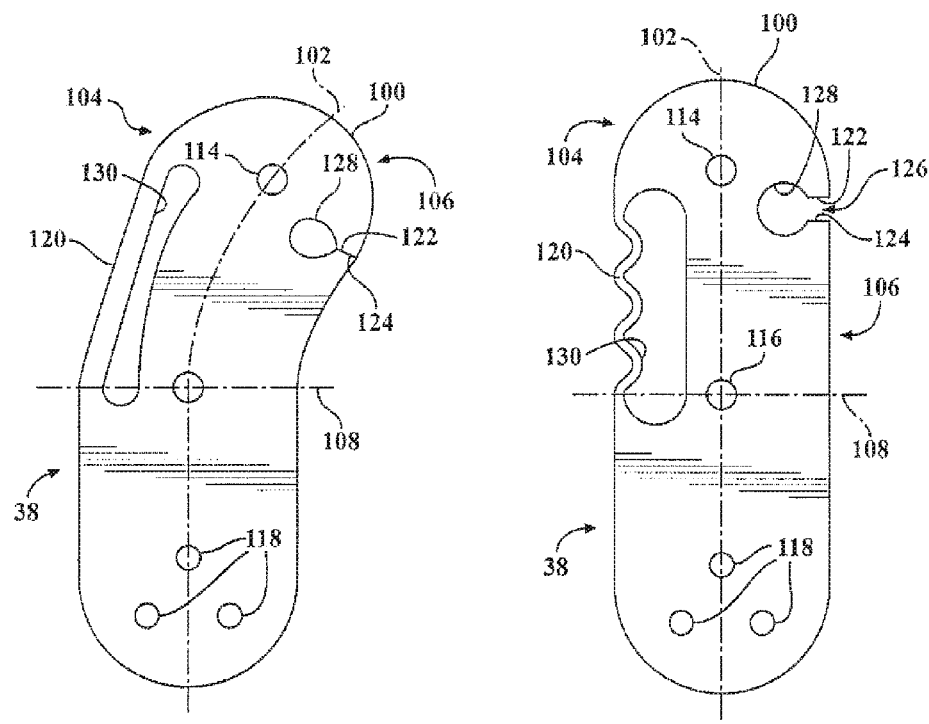
FIG. 7
FIG. 8

ENERGY ABSORBING BRACKET FOR A SEAT OF A VEHICLE

CROSS REFERENCE TO RELATED APPLICATIONS

This application is the National Stage of International Patent Application No. PCT/US2011/051554, filed on Sep. 14, 2011, which claims priority to and all the advantages of U.S. Provisional Patent Application Ser. No. 61/382,582 filed on Sep. 14, 2010 and incorporated herewith in its entirety.

BACKGROUND OF THE INVENTION

1. Field of the Invention

The subject invention generally relates to a seat for a vehicle, and more specifically to the seat having at least one energy absorbing feature.

2. Description of the Related Art

Seats for a vehicle and specifically a back portion of the seat typically must meet structural requirements by having sufficient strength to support repeated loads, which are exerted on the back portion of the seat, or seat back, during a crash event. For example, when a vehicle is hit from behind by another vehicle, a mass of an occupant applies a large force on the seat back over a small time period. To meet these structural requirements, the seat back is generally formed from metal such as steel, aluminum, or magnesium. For example, the seat back made from steel is able to meet the structural requirements by providing sufficient stiffness, strength, and ductility to satisfy the above-mentioned requirements.

Recently, more features and content have been designed into the seat back. As a result, a cost to manufacture the seat back has increased. In order to reduce costs, seat backs previously manufactured from metals are now being manufactured from a polymeric material. The seat backs produced from the polymeric material offer the ability to reduce the number of features and content designed into the seat back and therefore reduce manufacturing and assembly costs. Furthermore, weight reduction is another possible benefit of using polymeric material for the seat back, as well as greater design freedom and reduced profile, giving the vehicle increased interior space. However, the seat back made from the polymeric material must still meet the structural requirements for a crash event. For example, during a rear impact collision, the vehicle is accelerated in a forward direction. This causes the seat back to apply acceleration forces to the occupant over a short period of time. Therefore, the seat backs are typically required to manage the acceleration forces applied to the occupant while not exceeding deformation limits.

SUMMARY OF THE INVENTION AND ADVANTAGES

A bracket is used to couple together a seating frame member and a back frame member of a seat. The seating frame member provides a surface to support an occupant within a vehicle. The back frame member extends away from the seating frame member. The bracket comprises a periphery and a central longitudinal axis dividing the bracket into a front portion and a rear portion. The front portion of the bracket defines a yield segment for plastically deforming when a force above a predetermined value is applied to the back frame member. Plastically deforming the yield segment reduces an impact force transferred from the seat to the occupant caused by the force above the predetermined value. The periphery of the rear portion of the bracket includes a first contact surface and a second contact surface spaced from the first contact surface. The first and second contact surfaces define a bracket notch. The first contact surface moves into contact with the second contact surface as the yield segment plastically deforms thereby restricting the plastic deformation of the yield segment. Restricting the plastic deformation of the yield segments restricts a rotation of the back frame member relative to the seating frame member to ensure the rotation of the back frame member does not exceed a maximum deformation angle.

BRIEF DESCRIPTION OF THE DRAWINGS

Other advantages of the present invention will be readily appreciated, as the same becomes better understood by reference to the following detailed description, when considered in connection with the accompanying drawings wherein:

FIG. 6 is a schematic view of the occupant causing the back frame member to rotate relative to the seating frame member;

FIG. 7 is a front view of the bracket of FIG. 4 after the bracket has been deformed;

FIG. 8 is a front view of the bracket showing an alternative embodiment of the yield segment;

DETAILED DESCRIPTION OF THE INVENTION

Figure 1:
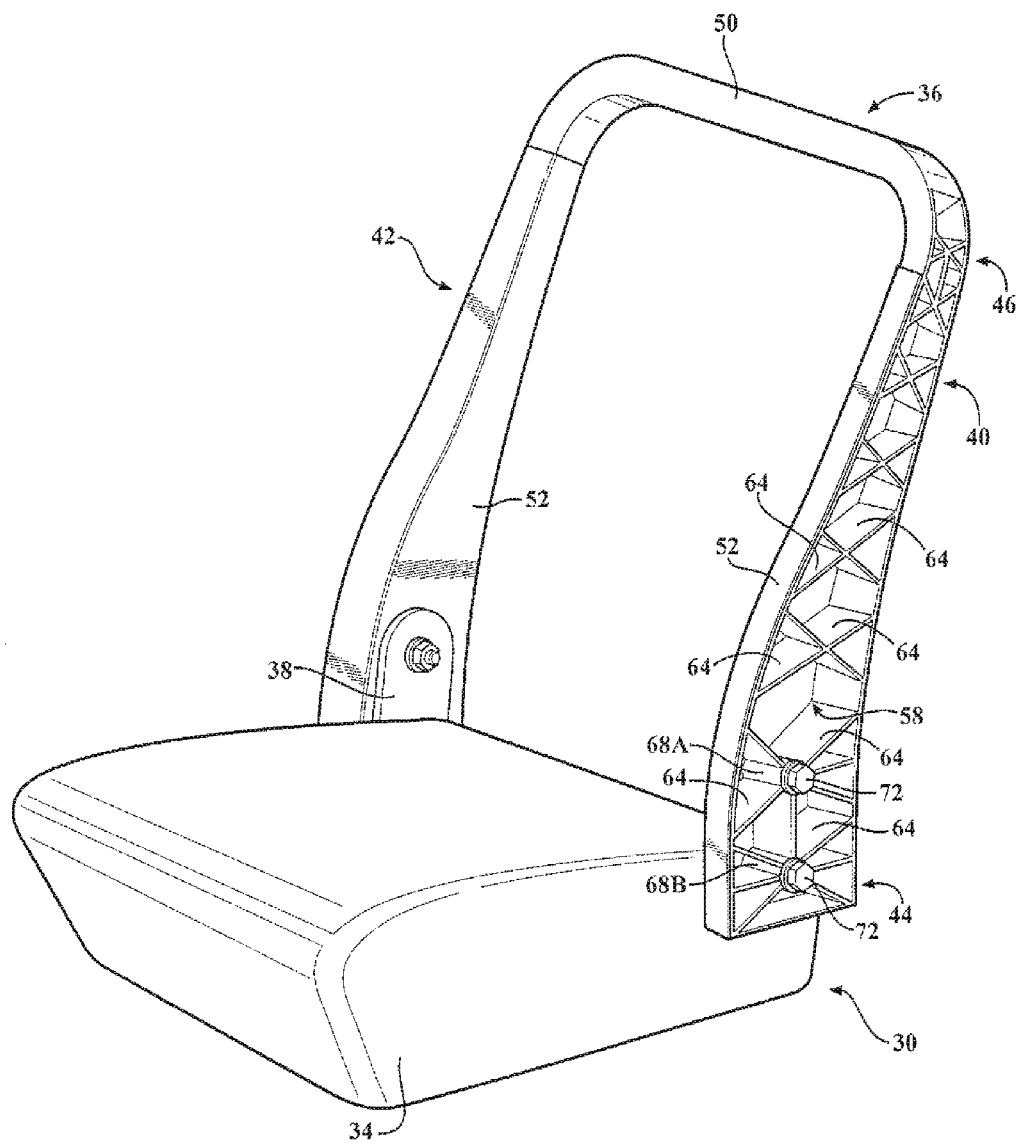
FIG. 1 is a perspective view of a seat including a back frame member and a seating frame member coupled together by a bracket.

Referring to the Figures, wherein like numeral indicate like or corresponding parts throughout the several views, a seat 30 for a vehicle is generally shown. The seat 30 is coupled to the vehicle for supporting an occupant 32 in a standard position within the vehicle. With reference to FIG. 1, the seat 30 includes a seating frame member 34 extending generally horizontally and a back frame member 36 coupled to and extending away from the seating frame member 34.

Figure 2:
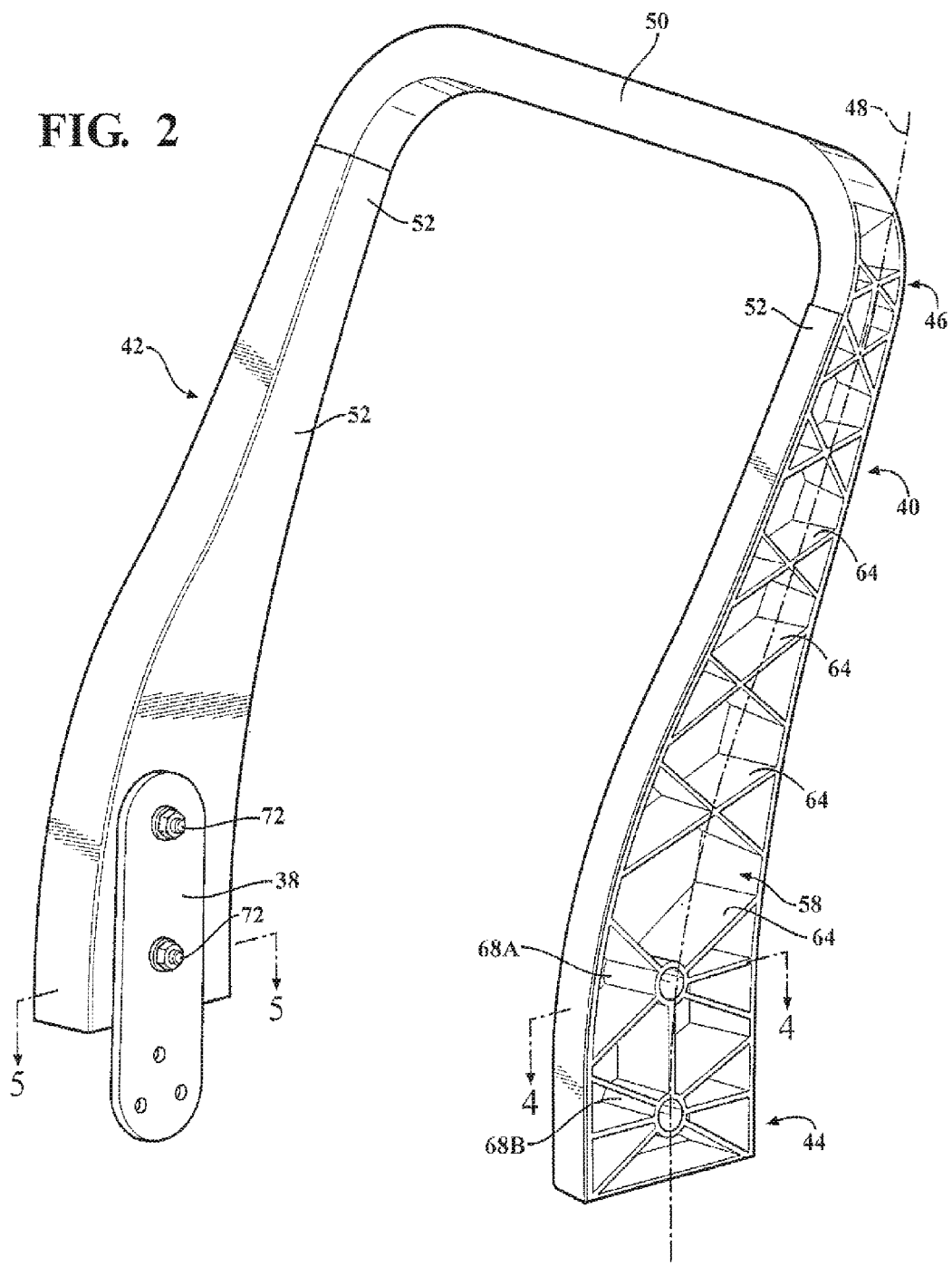
FIG. 2 is a perspective view of the back frame member of the seat.

The back frame member 36 generally extends vertically away from the seating frame member 34. The back frame member 36 may include a first side member 40 and a second side member 42 each extending generally upwardly from the seating frame member 34. The side members 40, 42 each have a proximal end 44 proximate the seating frame member 34 and a distal end 46 spaced from the seating frame member 34. With reference to FIG. 2, each of the side members 40, 42 define a side member axis 48 extending from the proximal end 44 to the distal end 46 of the side members 40, 42 dividing each of the side members 40, 42 in half. A top member 50 may be disposed between the side members 40, 42 at the distal end 46 of the side members 40, 42. Generally, the top member 50 rigidly coupled the first and second side members 40, 42 together. The top member 50 may also receive a headrest of the seat 30. It is to be appreciated that when employed, the top member 50 may be integral with the side members 40, 42 or may be a separate discrete component.

The back frame member 36 may comprise a polymeric material. The polymeric material is typically a thermoplastic material for allowing the side members 40, 42 to be injection molded. For example, the polymeric material of the side members 40, 42 may comprise a polyamide. When employed, the polyamide is selected from the group of nylon 6, nylon 6/6 and combinations thereof. The polyamide may be a fiber reinforced polyamide. An example of a suitable fiber reinforced polyamide is a glass-fiber reinforced polyamide that is commercially available from BASF Corporation under the trade name Ultramid® TG7S PA6. It should be appreciated that the side members 40, 42 may be formed from any type of suitable polymeric material, polyamide or not, reinforced or not, without departing from the nature of the present invention.

Figure 3:
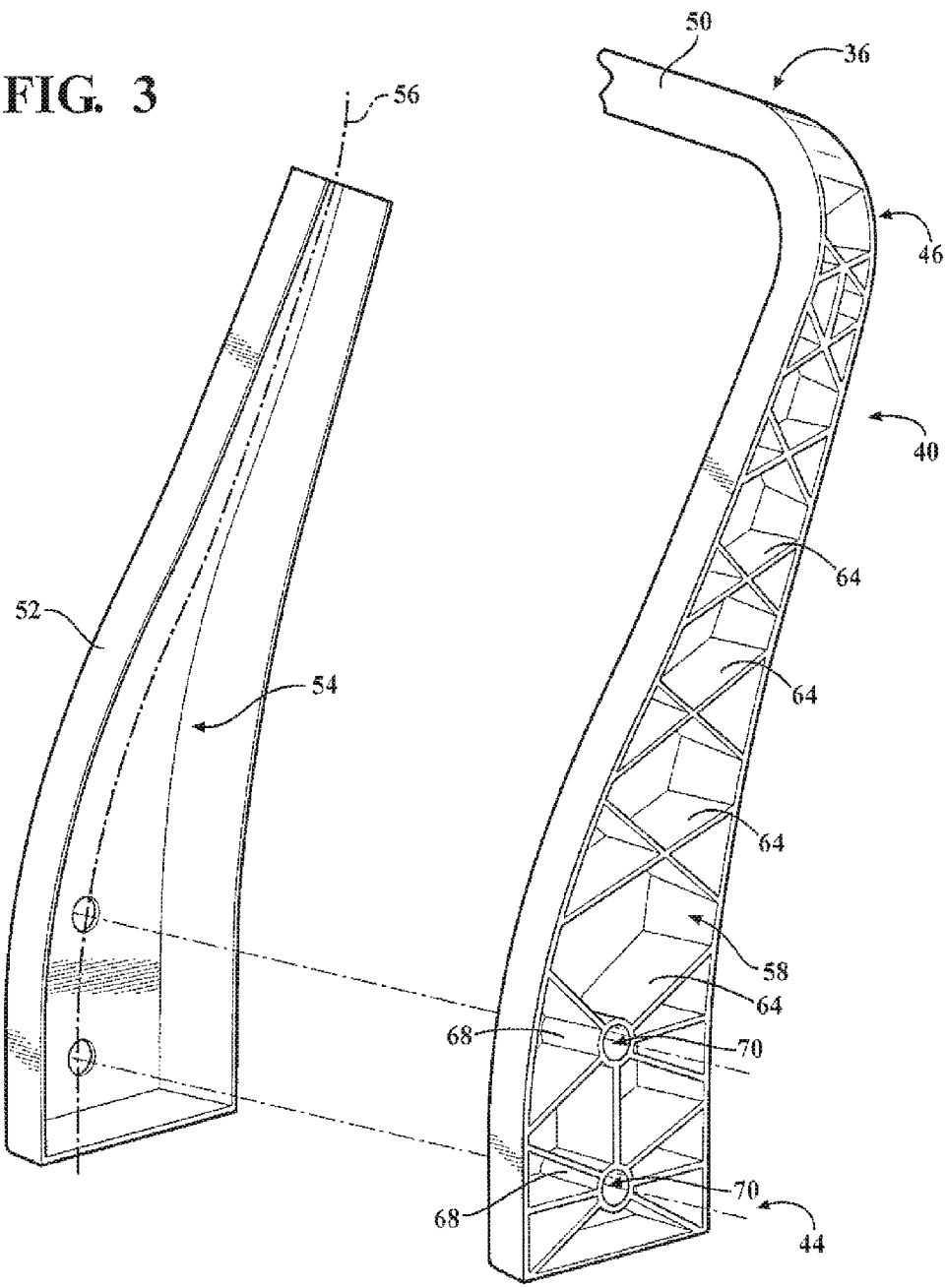
FIG. 3 is perspective assembly view of the back frame member of the seat having a reinforcing mat disposed about the back frame member.

As best shown in FIG. 3, the seat 30 may include a reinforcing mat 52 disposed about the back frame member 36. When employed, the reinforcing mat 52 imparts strength to the back frame member 36 for allowing the back frame member 36 to endure greater loads without failure as compared to the back frame member 36 without the reinforcing mat 52. The reinforcing mat 52 defines a cavity 54 presenting a general U-shaped cross-section for receiving the back frame member 36. Generally, the reinforcing mat 52, by itself, is flexible about a longitudinal axis 56 extending along the reinforcing mat 52 and may buckle when subjected to a load. As such, the back frame member 36 supports the reinforcing mat 52 to prevent flexing and buckling of the reinforcing mat 52 along the longitudinal axis 56. It is to be appreciated that when the first and second side members 40, 42 are present, the reinforcing mat 52 is disposed about each of the first and second side members 40, 42.

Typically, the reinforcing mat 52 comprises a glass-fiber filled polymeric material. It is to be appreciated that the glass-filled polymeric material may be the polymeric material of the back frame member 36 described above. Alternatively, the glass-filled polymeric material may be different from the polymeric material of the back frame member 36. Generally, glass fibers within the glass-filled polymeric material extend along the longitudinal axis 56 of the reinforcing mat 52. However, the plurality of fibers may extend in different directions or may be woven, i.e., interlaced with each other. Typically, the glass fibers are elongated such that stress on the reinforcing mat 52 is transmitted from the glass-filled polymeric material to the glass fibers. Transferring the stress allows the glass fibers to reinforce the glass-filled polymeric material.

The glass-filled polymeric material of the reinforcing mat 52 may be integrated with the glass fibers in a variety of ways. For example, the reinforcing mat 52 may be in the form of a continuous fiber reinforced mat that is preformed and subsequently integrated with the glass-filled polymeric material. An example of a suitable continuous fiber reinforced mat is that which is commercially available from Performance Materials Corporation of Camarillo, Calif. under the trade name Continuous Fiber Reinforced Thermoplastic (CFRT).

With reference to FIGS. 1-3, the back frame member 36 defines a U-shaped cavity 58 for providing the back frame member 36 with rigidity. Generally, the back frame member 36 includes a base portion 60 and two or more leg portions 62 extending from the base portion 60 to define the U-shaped cavity 58. The leg portions 62 are spaced from each other along the base portion 60. Typically, one of the leg portions 62 is adjacent the occupant 32 sitting in the seat 30 and the other leg portions 62 are spaced from the leg portion 62 adjacent the occupant 32 in a direction away from the occupant 32. It is to be appreciated that the base portion 60 and the leg portions 62 may be integrally formed. When present, the reinforcing mat 52 wraps around the base portion 60 and the leg portions 62. Additionally, when present, each of the first and second side members 40, 42 have the base portion 60 and the leg portions 62 for defining the U-shaped cavity 58.

As best shown in FIGS. 1-3, a plurality of ribs 64 may be disposed within the U-shaped cavity 58 of the back frame member 36. Generally, the ribs 64 are coupled to the base portion 60 and the leg portions 62 of the back frame member 36 for reinforcing the back frame member 36. It is to be appreciated that the ribs 64 may be disposed within the U-shaped cavity 58 in any configuration suitable to reinforce the back frame member 36. Generally, the ribs 64 are arranged in a series of intersecting pairs to form a criss-cross configuration.

Figure 4:
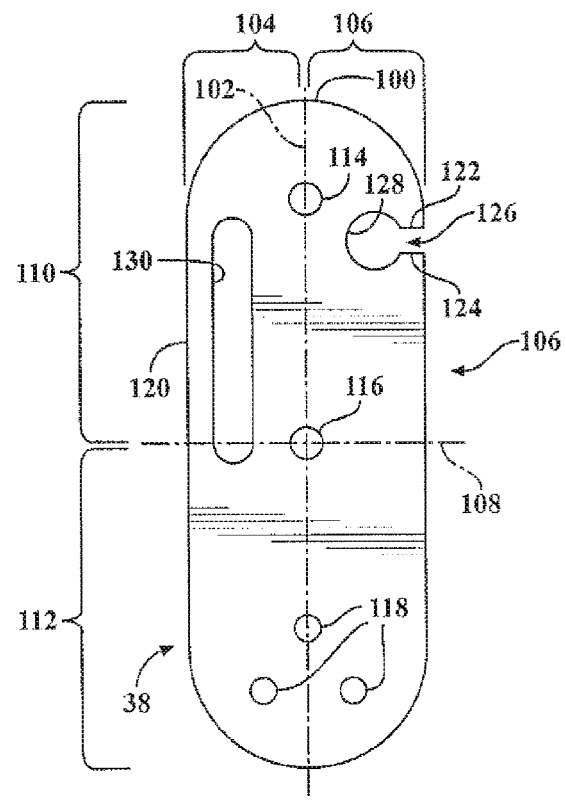
FIG. 4 is a front view of the bracket having a yield segment.

As shown in FIG. 1, a bracket 38 is coupled to both the seating frame member 34 and the back frame member 36 for coupling the seating frame member 34 to the back frame member 36. It is to be appreciated that when the first and second side members 40, 42 are present, each of the side members 40, 42 are coupled to the seating frame member 34 by the bracket 38. With reference to FIG. 4, the bracket 38 has a periphery 100, presenting a configuration of the bracket 38. Typically, the configuration of the bracket 38 is elliptical. However, it is to be appreciated that the configuration of the bracket 38 may be different from elliptical, such as rectangular. The bracket 38 has a central longitudinal axis 102 dividing the bracket into a front portion 104 and a rear portion 106. The front portion 104 is adjacent to the occupant 32 when the occupant 32 is sitting in the seat 30. The bracket 38 also has a lateral axis 108 that is perpendicular to the central longitudinal axis 102 for dividing the bracket 38 into an upper portion 110 and a lower portion 112.

The bracket 38 includes an upper attachment hole 114 and a lower attachment hole 116 spaced from the upper attachment hole 114. The attachment holes 114, 116 receive a fastening element 72 to couple the bracket 38 to the back frame member 36. Typically, the attachment holes 114, 116 are aligned with the central longitudinal axis 102. Said differently, the central longitudinal axis 102 extends through center points of the attachment holes 114, 116. The lateral axis 108 typically extends through the lower attachment hole 116. The bracket 38 may also define a seat attachment hole 118 for receiving another fastening element 72 for coupling the bracket 38 to the seating frame member 34. Once the fastening elements 72 are received by the attachment holes 114, 116, & 118, the bracket 38 maintains a position of the fastening elements 72 relative to each other and relative to the seating frame member 34.

Figure 5:
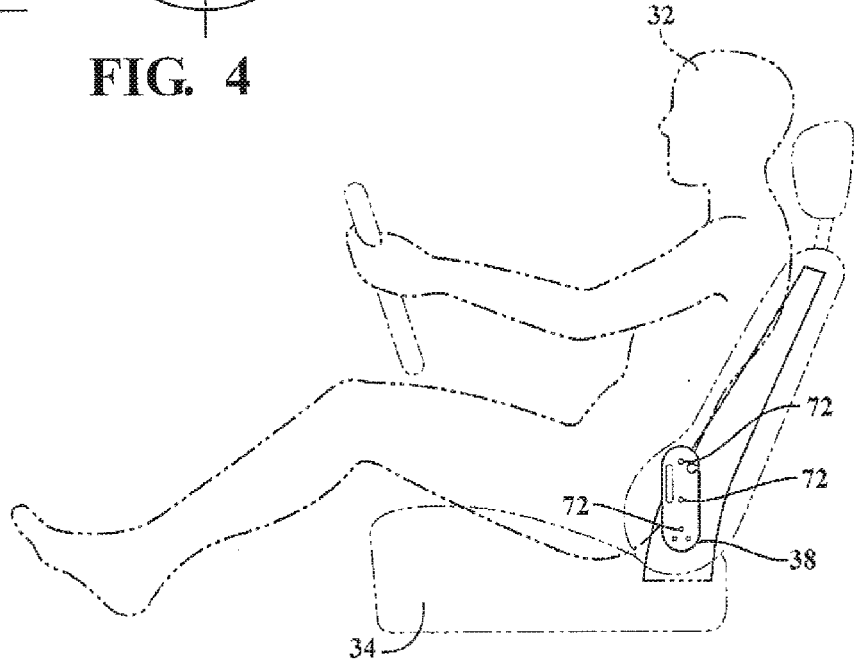
FIG. 5 is a schematic view of an occupant supported by the seat.

Generally, during a collision event, such as a rear end collision, the occupant 32 sitting in the seat 30 is impacted by the back frame member 36 of the seat 30 as the vehicle is abruptly accelerated forward. As a result, the occupant 32 applies a collision force to the seat 30 and conversely, the seat 30 applies an impact force, which is related to the collision force, to the occupant 32. However, the impact force can be reduced compared to the collision force by providing an energy absorbing feature to dissipate a portion of the collision force. As shown in FIGS. 5 and 6, generally, the energy absorbing feature allow for a safe displacement of the occupant 32 relative to the seating frame member 34. As such, the energy absorbing feature deforms during the collision event thereby safely dissipating the portion of the energy of the collision force, which in turn reduces the impact force experienced by the occupant 32.

The bracket 38 is the energy absorbing feature and deforms as the occupant 32 applies the collision force to the back frame member 36. More specifically, the front portion 104 of the bracket 38 defines a yield segment 120 for plastically deforming when the force above the predetermined value is applied to the back frame member 36 to reduce the impact force transferred from the seat 30 to the occupant 32 caused by the force above the predetermined value. As shown in FIGS. 6 and 7, when the collision force is a force above a predetermined value, fastening element 72 in the upper attachment hole 114 deforms the bracket 38 as the back frame member 36 rotates relative to the seating frame member 34. More specifically, the fastening element 72 coupling the bracket 38 to the back frame member 36 transfers the collision force from the back frame member 36 to the bracket 38. The collision force acting on the bracket 38 causes the yield segment 120 to plastically deform as the yield segment 120 is stretched resulting in necking of the yield segment 120. As the yield segment 120 deforms, the top portion 110 of the bracket 38 pivots about the lower attachment hole 116.

The periphery 100 of the rear portion 106 of the bracket 38 includes a first contact surface 122 and a second contact surface 124 spaced from the first contact surface 122. The first and second contact surfaces 122, 124 define a bracket notch 126 in the bracket 38. During the collision event, the first contact surface 122 moves into contact with the second contact surface 124 as the yield segment 120 plastically deforms thereby restricting the plastic deformation of the yield segment 120. Limiting the plastic deformation of the yield segment 120 limits the rotation of the back frame member 36 to ensure the occupant 32 is safely support by the seat 30 during the collision event. Additionally, limiting the plastic deformation of the bracket 38 restricts the rotation of the back frame member 36 relative to the seating frame member 34 to ensure the rotation of the back frame member 36 does not exceed a maximum deformation angle.

The bracket 38 may define a relief notch 128 in communication with the bracket notch 126 for allowing the first contact surface 122 to move into contact with the second contact surface 126. Said differently, the relief notch 128 prevents the bracket 38 from buckling at the bracket notch 126 so that the first contact surface 122 will contact the second contact surface 124 as the bracket 38 deforms.

The deformation of the bracket 38 results in a displacement of the occupant 32 from the standard position toward the back frame member 36 of the seat 30, as shown in FIG. 6. Said differently, the deformation of the bracket 38 results in the rotation of the back frame member 36, which results in displacement of the occupant 32 thereby reducing the impact force transferred from the seat 30 to the occupant 32 caused by the force above the predetermined value. As described above, the upper portion 110 of the bracket 38 pivots about the lower attachment hole 116 as the yield segment 120 plastically deforms. The back frame member 38 rotates with the pivoting of the upper portion 110 of the bracket 38 because the fastening element 72 couples the back frame member 36 to the bracket 38 at the upper attachment hole 114. Generally, the deformation of the bracket 38 continues until the collision force is entirely dissipated or until the first contact surface 122 contacts the second contact surface 124.

Generally, the greater the deformation of the bracket 38, the greater the displacement of the occupant 32 thereby reducing the impact force experienced by the occupant 32. It is to be appreciated that the force above the predetermined value is higher than the normal loads applied to the back frame member 36 during the course of normal operation of the vehicle. Said differently, the bracket 38 does not deform under normal, non-collision loads.

The front portion 104 of the bracket 38 may define at least one void 130 for allowing the yield segment 120 to plastically deform. Said differently, the void 130 creates a weak point in the bracket 38 to control a location of the plastic deformation in the bracket 38. The yield segment 120 is disposed between the void 130 and the periphery 100 of the bracket 38. The periphery 100 of the bracket 38 may even define a portion of the yield segment 120. The yield segment 120 is proximate to the periphery 100 because the periphery 100 will experience greater loads during the collision event. The void 130 is typically spaced from the central longitudinal axis 102 and is elongated in a direction parallel to the central longitudinal axis 102. Elongating the void 130 in the direction parallel to the central longitudinal axis 102 allows the front portion 104 of the bracket 38 to stretch thereby allowing the back frame member 36 to rotate to displace the occupant 32.

The displacement of the occupant 32 is dependent on a stiffness of the bracket 38, i.e., the higher the stiffness of the bracket 38, the less displacement the occupant 32 experiences. Therefore, the displacement of the occupant 32 during the collision event can be controlled by the stiffness of the bracket 38. However, the stiffness of the bracket 38 must be sufficient to resist normal loads applied to the seat 30, such as when the occupant 32 enters and exits the seat 30, without deforming the bracket 38. The bracket 38 may comprise any suitable material capable of meeting the stiffness requirement for resisting the normal loads that act on the seat. Typically, the bracket 38 is a metal, such as steel.

Figure 9:
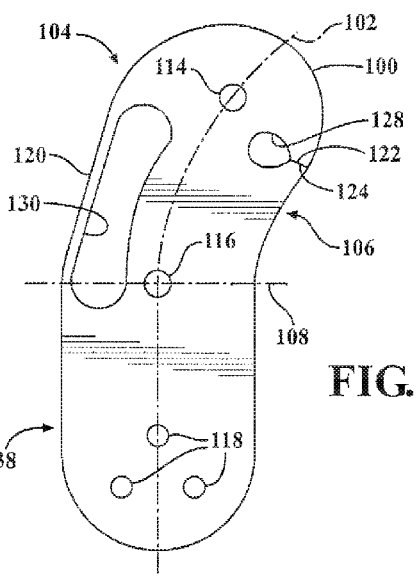
FIG. 9 is a front view of the bracket of FIG. 8 after the bracket has been deformed.

It is to be appreciated that the stiffness of the yield segment 120 is dependent on the configuration of the yield segment 120. For example, as shown in FIG. 8, the yield segment 120 may define a plurality of curves arranged in a sinusoidal configuration along a length of the yield segment 120. During the collision event, the plurality of curves straighten out when the force above the predetermined value is applied to the back frame member 36 thereby eliminating the sinusoidal configuration. Once the yield segment 120 straightens out, the yield segment 120 deforms by necking as the force above the predetermined value is continued to be applied to the back frame member 36, as shown in FIG. 9. When employed, the curves provide the yield segment 120 with an initial stiffness, which is lower than the stiffness of non-curved yield segments 120. The curves lower the initial stiffness of the yield segment 120 because the curves must first be pulled straight under tension before the yield segment 120 begins to plastically deform by necking. Lowering the initial stiffness of the yield segment 120 protects the occupant 32 from whiplash injuries during the collision event.

Figure 10:
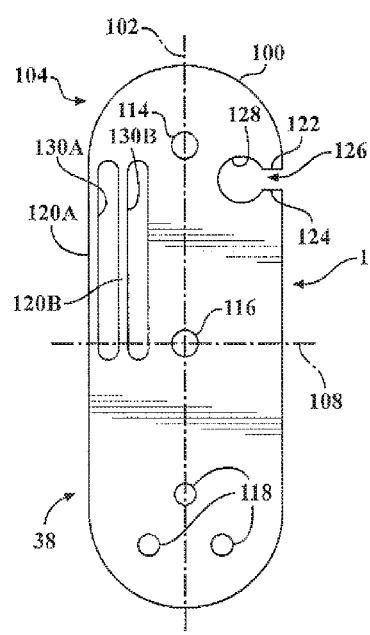
FIG. 10 is a front view of an alternative embodiment of the bracket with the bracket having a first yield segment and a second yield segment.
Figure 11:
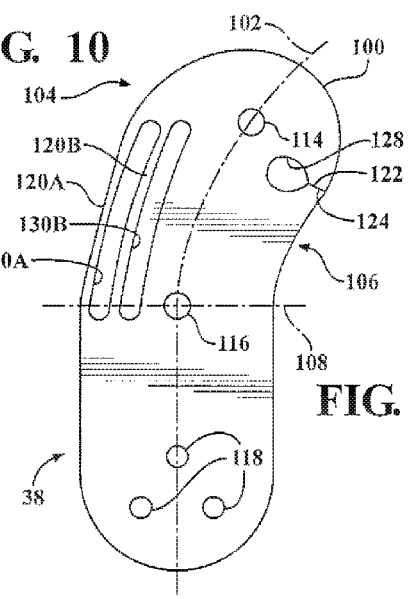
FIG. 11 is a front view of the bracket of FIG. 10 after the bracket has been deformed.

With reference to FIGS. 10 and 11, it is to be appreciated that the bracket 38 may include any number of yield segments 120. For example, the void 130 described above may be further defined as a first void 130A and the yield segment described above may be further defined as a first yield segment 120A. In such an embodiment, the bracket 38 may define a second void 130B spaced between the first void 130A and the central longitudinal axis 102. As such, a second yield segment 120B is disposed between the voids 130A, 130B. When both the first and second yield segments 120A, 120B are present, the first yield segment 120A plastically deforms first and then the second yield segment 120B plastically deforms, thereby providing a two-stage deformation of the bracket 38. The two-stage deformation further minimizes the impact force applied to the occupant 32 because staggering the deformation of the yield segments 120A, 120B increases a maximum deformation of the bracket 38 thereby dissipating more of the collision force applied to the bracket 38.

Figure 12:
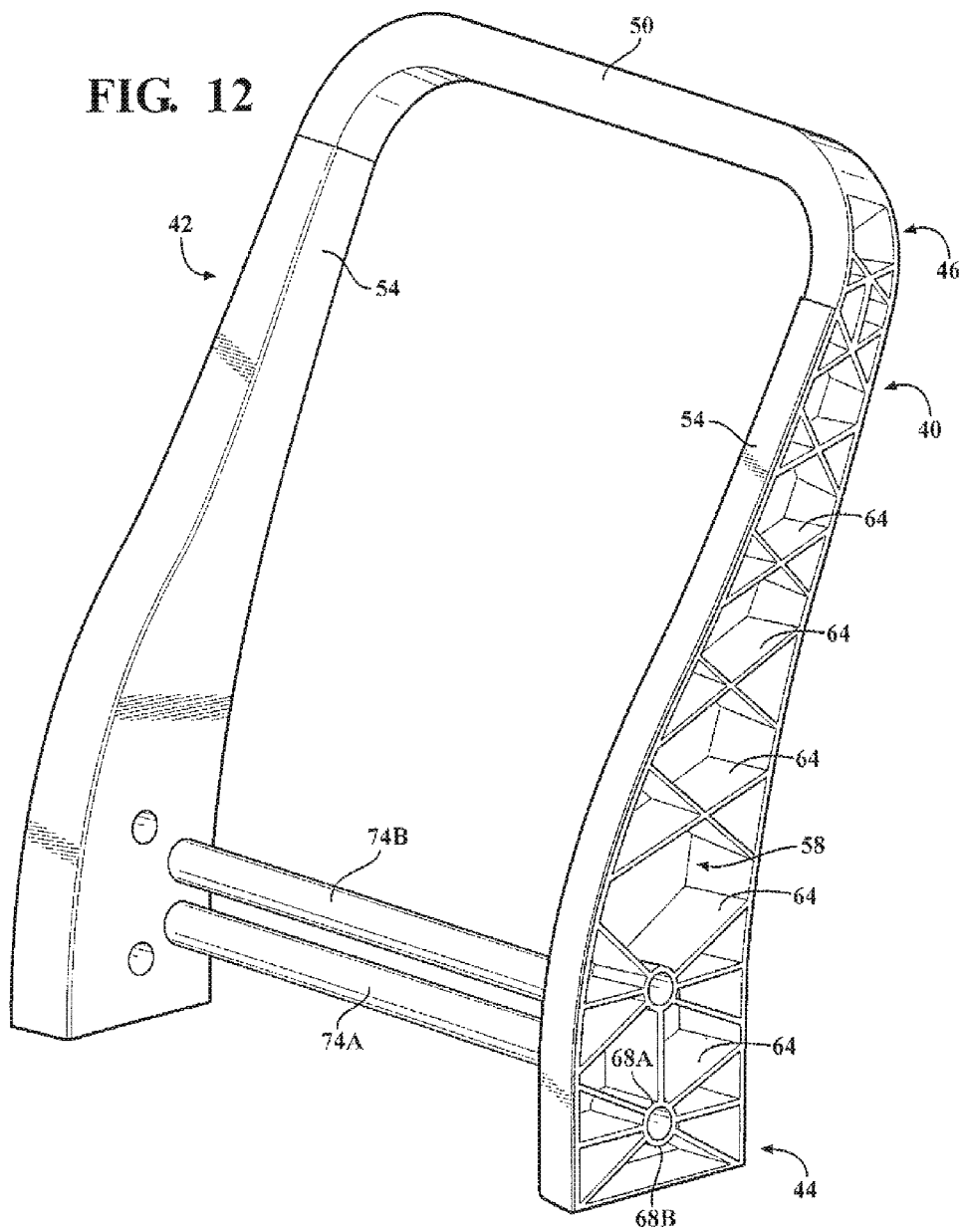
FIG. 12 is a perspective view of the seat showing a cross member and boss of the seat.

As shown in FIG. 1, the seat 30 may include a boss 68 disposed within the U-shaped cavity 58 with the fastening element 72 disposed within the bore 70 of the boss 68. The boss 68 may be an additional energy absorbing feature such that the fastening element 72 deforms the boss 68 during the collision. Additional description of the boss 68 is disclosed in co-pending application serial number PCT/US2011/051571, the contents of which are incorporated by reference. Furthermore, as shown in FIG. 12, the seat 30 may include at least one cross member 74 disposed between the first and second side members 40, 42, with the cross member 74 acting as an additional energy absorbing feature. Additional description of the cross member 74 is disclosed in co-pending application serial number PCT/US2011/051558, the contents of which are incorporated by reference.

Generally, the impact force experienced by the occupant 32 as a result of the collision force can be minimized with the energy absorbing feature while still satisfying safe displacement requirements for the back frame member 36 of the seat 30. With the energy absorbing feature, the impact force is managed over a longer time period, thereby reducing a peak impact force acting on the occupant 32. With the reduction of the peak impact force, the occupant 32 experiences less injury and the seat 30 also experiences lower stress levels. As a result of the seat 30 experiencing lower stress levels, more optimal designs can be utilized, and the polymeric materials can be used to manage the collision force.

Obviously, many modifications and variations of the present invention are possible in light of the above teachings. The foregoing invention has been described in accordance with the relevant legal standards; thus, the description is exemplary rather than limiting in nature. Variations and modifications to the disclosed embodiment may become apparent to those skilled in the art and do come within the scope of the invention.

What is claimed is:

1. A seat for supporting an occupant of a vehicle, said seat comprising:
    a seating frame member for providing a surface to support the occupant;
    a back frame member extending away from said seating frame member; and
    a bracket coupled to both said seating frame member and said back frame member with said bracket having a periphery and having a central longitudinal axis dividing said bracket into a front portion and a rear portion;
    wherein said front portion of said bracket defines a yield segment for plastically deforming when a force above a predetermined value is applied to said back frame member to reduce an impact force transferred from said seat to the occupant caused by the force above the predetermined value;
    wherein said periphery of said rear portion of said bracket includes a first contact surface and a second contact surface spaced from said first contact surface to define a bracket notch whereby said first contact surface moves into contact with said second contact surface as said yield segment plastically deforms thereby restricting the plastic deformation of said yield segment; and
    wherein said front portion of said bracket defines at least one void for allowing said yield segment to plastically deform with said yield segment disposed between said void and said periphery of said bracket.

2. A seat as set forth in claim 1 wherein said void is spaced from said central longitudinal axis and is elongated in a direction parallel to said central longitudinal axis.

3. A seat as set forth in claim 2 wherein said yield segment defines a plurality of curves arranged in a sinusoidal configuration along a length of said yield segment whereby said plurality of curves straighten out thereby eliminating said sinusoidal configuration and said yield segment deforms by necking when the force above the predetermined value is applied to said back frame member.

4. A seat as set forth in claim 1 wherein said void is further defined as a first void and said yield segment is further defined as a first yield segment and said bracket defines a second void spaced between said first void and said central longitudinal axis with said second void defining a second yield segment disposed between said voids whereby said first yield segment plastically deforms and then said second yield segment plastically deforms thereby providing a two-stage deformation of said bracket.

5. A seat as set forth in said 1 wherein said bracket defines a relief notch in communication with said bracket notch for allowing said first contact surface to move into contact with said second contact surface.

6. A seat as set forth in claim 1 wherein said bracket includes an upper attachment hole and a lower attachment hole spaced from said upper attachment hole for receiving a fastening element to couple said bracket to said back frame member and with said attachment holes aligned with said central longitudinal axis.

7. A seat as set forth in claim 6 wherein said bracket has a lateral axis extending through said lower attachment hole with said lateral axis perpendicular to said central longitudinal axis for dividing said bracket into an upper portion and a lower portion whereby said upper portion of said bracket pivots about said lower attachment hole as said yield segment plastically deforms when the force above the predetermined value is applied to said back frame member.

8. A seat as set forth in claim 6 wherein said bracket defines a seat attachment hole for receiving another fastening element for coupling said bracket to said seating frame member.

9. A bracket for coupling together a seating frame member and a back frame member of a seat, which supports an occupant within a vehicle, with the seating frame member providing a surface to support the occupant and the back frame member extending away from the seating frame member, said bracket comprising:
    a periphery;
    a central longitudinal axis dividing said bracket into a front portion and a rear portion;
    wherein said front portion of said bracket defines a yield segment for plastically deforming when a force above a predetermined value is applied to the back frame member to reduce an impact force transferred from the seat to the occupant caused by the force above the predetermined value;
    wherein said periphery of said rear portion of said bracket includes a first contact surface and a second contact surface spaced from said first contact surface to define a bracket notch whereby said first contact surface moves into contact with said second contact surface as said yield segment plastically deforms thereby restricting the plastic deformation of said yield segment; and
    wherein said front portion of said bracket defines at least one void for allowing said yield segment to plastically deform with said yield segment disposed between said void and said periphery of said bracket.

10. A bracket as set forth in claim 9 wherein said void is spaced from said central longitudinal axis and is elongated in a direction parallel to said central longitudinal axis.

11. A bracket as set forth in claim 10 wherein said yield segment defines a plurality of curves arranged in a sinusoidal configuration along a length of said yield segment whereby said plurality of curves straighten out thereby eliminating said sinusoidal configuration and said yield segment deforms by necking when the force above the predetermined value is applied to the back frame member.

12. A bracket as set forth in claim 9 wherein said void is further defined as a first void and said yield segment is further defined as a first yield segment and said bracket defines a second void spaced between said first void and said central longitudinal axis with said second void defining a second yield segment disposed between said voids whereby said first yield segment plastically deforms and then said second yield segment plastically deforms thereby providing a two-stage deformation of said bracket.

13. A bracket as set forth in said 9 further defining a relief notch in communication with said bracket notch for allowing said first contact surface to move into contact with said second contact surface.

14. A bracket as set forth in claim 9 further comprising an upper attachment hole and a lower attachment hole spaced from said upper attachment hole for receiving a fastening element to couple said bracket to the back frame member and with said attachment holes aligned with said central longitudinal axis.

15. A bracket as set forth in claim 14 further defining a seat attachment hole for receiving another fastening element for coupling said bracket to the seating frame member.

16. A bracket for coupling together a seating frame member and a back frame member of a seat, which supports an occupant within a vehicle, with the seating frame member providing a surface to support the occupant and the back frame member extending away from the seating frame member, said bracket comprising:
 a periphery;
 a central longitudinal axis dividing said bracket into a front portion and a rear portion;
 an upper attachment hole and a lower attachment hole spaced from said upper attachment hole for receiving a fastening element to couple said bracket to the back frame member and with said attachment holes aligned with said central longitudinal axis;
 wherein said front portion of said bracket defines a yield segment for plastically deforming when a force above a predetermined value is applied to the back frame member to reduce an impact force transferred from the seat to the occupant caused by the force above the predetermined value;
 wherein said periphery of said rear portion of said bracket includes a first contact surface and a second contact surface spaced from said first contact surface to define a bracket notch whereby said first contact surface moves into contact with said second contact surface as said yield segment plastically deforms thereby restricting the plastic deformation of said yield segment; and
 wherein said bracket includes a lateral axis extending through said lower attachment hole with said lateral axis perpendicular to said central longitudinal axis for dividing said bracket into an upper portion and a lower portion whereby said upper portion of said bracket pivots about said lower attachment hole as said yield segment plastically deforms when the force above the predetermined value is applied to the back frame member.

* * * * *